(12) United States Patent
Yamamoto et al.

(10) Patent No.: US 8,095,353 B2
(45) Date of Patent: Jan. 10, 2012

(54) POWER INDEX COMPUTING APPARATUS, METHOD OF COMPUTING POWER INDEX, AND COMPUTER PRODUCT

(75) Inventors: Tatsuya Yamamoto, Kawasaki (JP); Yutaka Tamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 12/325,206

(22) Filed: Nov. 30, 2008

(65) Prior Publication Data

US 2009/0157375 A1     Jun. 18, 2009

(30) Foreign Application Priority Data

Dec. 3, 2007   (JP) ................................ 2007-312461
Jun. 27, 2008   (JP) ................................ 2008-168981

(51) Int. Cl.
*G06F 17/50*     (2006.01)
(52) U.S. Cl. .......................................................... 703/14
(58) Field of Classification Search ............... 703/2, 14; 327/202, 141, 215; 700/22; 713/300; 702/122; 365/233, 230.06; 345/100
See application file for complete search history.

(56) References Cited

U.S. PATENT DOCUMENTS

| | | | |
|---|---|---|---|
| 6,204,707 B1 * | 3/2001 | Hamada et al. ................ | 327/202 |
| 6,480,815 B1 * | 11/2002 | Olson et al. ..................... | 703/14 |
| 6,992,948 B2 * | 1/2006 | Asada ....................... | 365/230.06 |
| 7,076,405 B1 * | 7/2006 | Uchino ............................ | 703/2 |
| 7,580,824 B1 * | 8/2009 | Lewis et al. ..................... | 703/14 |
| 2002/0126565 A1 * | 9/2002 | Kawai et al. ................... | 365/233 |
| 2002/0133241 A1 * | 9/2002 | Takahashi et al. .............. | 700/22 |
| 2004/0054976 A1 | 3/2004 | Takahashi et al. | |
| 2005/0040873 A1 * | 2/2005 | Wada et al. .................... | 327/215 |
| 2006/0082400 A1 * | 4/2006 | Isono ............................ | 327/141 |
| 2006/0248354 A1 * | 11/2006 | Pineda De Gyvez et al. | 713/300 |
| 2006/0256066 A1 * | 11/2006 | Moon ........................... | 345/100 |
| 2008/0162071 A1 * | 7/2008 | Stevens et al. ................ | 702/122 |

FOREIGN PATENT DOCUMENTS

| | | |
|---|---|---|
| JP | 2001-056827 | 2/2001 |
| JP | 2004-228417 | 8/2004 |
| JP | 2006-277332 | 10/2006 |
| WO | WO-2007/037017 | 4/2007 |

\* cited by examiner

*Primary Examiner* — Kandasamy Thangavelu
(74) *Attorney, Agent, or Firm* — Fujitsu Patent Center

(57) ABSTRACT

A power index computing apparatus that computes a power index for a circuit having one or more modules includes an obtaining unit that obtains estimated power consumption for a module in the circuit and a first computing unit that computes entropy based on a transition probability of an output signal of the module during a simulation period. The entropy is indicative of an expected value of a data volume output from the module, and the output signal is output to a destination that is external to the module. The power index computing apparatus further includes a second computing unit that computes a power index based on the estimated power consumption and the entropy, where the power index concerns power consumption for output of the output signal with respect to the estimated power consumption. An output unit of the power index computing apparatus outputs a result of the second computing unit.

16 Claims, 15 Drawing Sheets

| MODULE | POWER CONSUMPTION [mW] |
|---|---|
| M1 | P1 |
| M2 | P2 |
| ⋮ | ⋮ |
| Mi | Pi |
| ⋮ | ⋮ |
| Mm | Pm |

| CLOCK CYCLE | CHANGED VALUES |
|---|---|
| 1 | SEND = 1, DATA = 3 |
| 2 | WSTB = 1, WDATA = 1, RECV = 1 |
| ⋮ | ⋮ |
| j | WDATA = 3, RECV = 0 |
| ⋮ | ⋮ |
| n | WSTB = 0, SEND = 0 |

| NAME OF INTERFACE | TRANS-MITTING MODULE | RECEIV-ING MODULE | CONTROL CONDITION | DATA SIGNAL | BITS | PRIO-RITY |
|---|---|---|---|---|---|---|
| C1 | M1 | M2 | SEND&RECV | DATA [63:0] | 64 | 1 |
| ⋮ | ⋮ | ⋮ | ⋮ | ⋮ | ⋮ | ⋮ |
| Ck | M7 | M8 | ERROR.rise | ERROR | 1 | 1000 |
| ⋮ | ⋮ | ⋮ | ⋮ | ⋮ | ⋮ | ⋮ |
| Ct | ... | ... | ... | ... | ... | ... |

600-1, 600-k, 600-t

| TRANS-MITTING MODULE | POWER INDEX [mW/bit] | DATA VOLUME OF EFFECTIVE DATA SIGNALS [bit] | POWER CONSUMPTION [mW] |
|---|---|---|---|
| M10 | 1995.00 | 6 | 11.97 |
| M7 | 230.00 | 12 | 2.76 |
| M3 | 66.29 | 35 | 2.32 |
| M8 | 2.05 | 2707 | 5.56 |
| M5 | 1.06 | 32389 | 34.29 |
| M12 | 0.70 | 11712 | 8.14 |
| M2 | 0.16 | 36315 | 5.68 |
| M6 | 0.14 | 25705 | 3.53 |
| M9 | 0.13 | 24496 | 3.25 |
| M1 | 0.12 | 3812 | 0.45 |
| M11 | 0.08 | 43332 | 3.25 |
| M4 | 0.07 | 53131 | 3.68 |

| CLOCK CYCLE | TRANSITIONED OUTPUT SIGNAL |
|---|---|
| 1 | OP1, OP3 |
| 2 | OP4, OP5, OP6 |
| ⋮ | ⋮ |
| n | ⋯ |

| MODULE | OUTPUT SIGNAL |
|---|---|
| M1 | OP1, OP2, OP3 |
| M2 | OP4, OP5, OP6, OP7 |
| ⋮ | ⋮ |
| Mm | ⋯, OP x |

| MODULE | OUTPUT SIGNAL | NUMBER OF TRANSITIONS |
|---|---|---|
| M1 | OP1 | N1 |
| | OP2 | N2 |
| | OP3 | N3 |
| M2 | OP4 | N4 |
| | OP5 | N5 |
| | OP6 | N6 |
| | OP7 | N7 |
| ⋮ | ⋮ | ⋮ |
| Mm | ⋮ | ⋮ |
| | OPx | Nx |

| MODULE M2 | | |
|---|---|---|
| OUTPUT SIGNAL | p(X) | $-p(X) \cdot \log_2 p(X)$ |
| OP4 | 1/10 | 0.332 |
| OP5 | 1/10 | 0.332 |
| OP6 | 1/10 | 0.332 |
| OP7 | 9/10 | 0.137 |

| ENTROPY H2 |
|---|
| 1.10 |

| MODULE M2 | | |
|---|---|---|
| OUTPUT SIGNAL | p(X) | $-p(X) \cdot \log_2 p(X)$ |
| OP4 | 9/10 | 0.137 |
| OP5 | 9/10 | 0.137 |
| OP6 | 9/10 | 0.137 |
| OP7 | 9/10 | 0.137 |

ENTROPY H2
0.55

2500

POWER INDEX COMPUTING APPARATUS, METHOD OF COMPUTING POWER INDEX, AND COMPUTER PRODUCT

CROSS-REFERENCE TO RELATED APPLICATIONS

This application is based upon and claims the benefit of priority from the prior Japanese Patent Application No. 2007-312461, filed on Dec. 3, 2007 and Japanese Patent Application No. 2008-168981, filed on Jun. 27, 2008, the entire contents of which are incorporated herein by reference.

BACKGROUND OF THE INVENTION

1. Field of the Invention

The present invention pertains to computation of a power index that assists in lowering power consumption in a semiconductor integrated circuit.

2. Description of the Related Art

In recent years, power consumption in semiconductor integrated circuits has increased as semiconductor integrated circuits continue to become more integrated, larger, and faster. As a result, performance degradation and/or shorter life spans of semiconductor integrated circuits due to heat generated by the circuit itself have become problems. Solutions include accurate estimation of power consumption at a design phase and redesign of the circuit to reduce power consumption.

Simulation is commonly used to estimate power consumption. In a simulation, input patterns are fed to a semiconductor integrated circuit, circuit operation is simulated, and the number of transitions of signals is counted. The power consumed at one transition of a signal is multiplied by the number of transitions, and the sum for all the signals is calculated, thereby giving power consumption for the semiconductor integrated circuit.

Japanese Patent Application Laid-Open Publication No. 2001-056827 discloses a method of estimating power consumption in which throughput per unit time of a bus is set; a core having a desirable function is extracted from a database and selected as an element; a connection surface of a bus or a connection part of the bus to an element is configured to determine the connection relation between the bus and each of elements; and simulation is carried out. After the process time and element configuration are clarified, performance is analyzed to evaluate power consumption of selected elements.

International Publication Pamphlet No. 2007-037017 discloses a method to measure the number of operations of a characteristic signal at each interval where power consumption is analyzed, the characteristic signal designating an operation mode of a circuit block. Based on the number of operations measured, it is determined whether the number of operations of the circuit block is to be measured. Only when it is determined that the number of operations of the circuit block is to be measured, is the number of operations of the circuit block measured.

To reduce power consumption in a semiconductor integrated circuit, Japanese Patent Application Laid-Open Publication No. 2006-277332 discloses a method, where in a semiconductor integrated circuit including multiple central processing units (CPUs) connected to a network, frequencies of a first and second CPU are changed and the provision of a clock signal to the first CPU is controlled according to the processing status of the first and second CPUs.

To lower power consumption in a semiconductor integrated circuit, Japanese Patent Application Laid-Open Publication No. 2004-228417 discloses a method where the volume of data in a functional module of a semiconductor integrated circuit is measured, and a clock frequency, power supply voltage and substrate bias are controlled so that a ratio of performance to power consumption is maximized based on the result of the measurement.

According to the conventional techniques above, when improvements in power consumption are conducted based on an estimation of power consumption, it is difficult to identify which module in a circuit is electrically problematic. A person who conducts power improvement work is not the designer of the circuit and thus typically, does not know the behavior of the circuit in detail.

Therefore, it is difficult to identify a module that is wasting significant power and to decide properly which part of a circuit should be reviewed, based on an estimation of power consumption. Conventionally, to improve power consumption, a process of trial and error is repeatedly performed for the modules in descending order of estimated power consumption.

However, a module that consumes significant power is not necessarily a module that wastes significant power. As a result, a worker has to check a circuit repeatedly retracing processes, whereby the workload and time involved in improving power consumption increase and the design time for a circuit becomes protracted.

Under such circumstances, a new technique that enables objective identification of a power wasting module even without detailed knowledge about circuit behavior is desirable.

SUMMARY OF THE INVENTION

It is an object of the present embodiment to at least solve the above problems in the conventional technologies.

A computer-readable recording medium according to one aspect of the present invention stores therein a computer program that causes a computer, with respect to a circuit having one or more modules, to execute obtaining estimated power consumption for a module in the circuit; computing entropy based on a transition probability of an output signal of the module during a simulation period, the entropy being indicative of an expected value of a data volume output from the module, and the output signal being output to a destination that is external to the module; computing a power index based on the estimated power consumption and the entropy, the power index concerning power consumption for output of the output signal with respect to the estimated power consumption; and outputting a result of the computing of the power index.

A power index computing apparatus according to another aspect of the present invention computes a power index for a circuit having one or more modules and includes an obtaining unit that obtains estimated power consumption for a module in the circuit; a first computing unit that computes entropy based on a transition probability of an output signal of the module during a simulation period, the entropy being indicative of an expected value of a data volume output from the module, and the output signal being output to a destination that is external to the module; a second computing unit that computes a power index based on the estimated power consumption and the entropy, the power index concerning power consumption for output of the output signal with respect to the estimated power consumption; and an output unit that outputs a result of the second computing unit.

A power index computing method according to yet another aspect of the present invention is a method of computing a power index for a circuit having one or more modules and includes obtaining estimated power consumption for a module in the circuit; computing entropy based on a transition probability of an output signal of the module during a simulation period, the entropy being indicative of an expected value of a data volume output from the module, and the output signal being output to a destination that is external to the module; computing a power index based on the estimated power consumption and the entropy, the power index concerning power consumption for output of the output signal with respect to the estimated power consumption; and outputting a result of the computing of the power index.

A computer-readable recording medium according to still another aspect of the present invention stores therein a computer program that causes a computer to execute obtaining estimated power consumption for a module in a circuit; computing a data volume of an effective data signal that is among the output signals transmitted from the module and is received by a recipient module; and computing, based on the estimated power consumption and the data volume, a power index concerning power consumption for transmission of the effective data signal with respect to the estimated power consumption; and outputting a result of the computing of the power index.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a diagram of an example of a simulation result;
FIG. 6 is a diagram of an interface table;
FIG. 20 is a diagram of an example of a counting result table;
FIGS. 21 to 25 are diagrams of examples of contents of the entropy table;
FIG. 26 is flowchart of another power index computing procedure of the power index computing apparatus.

DETAILED DESCRIPTION OF THE PREFERRED EMBODIMENTS

Referring to the accompanying drawings, exemplary embodiments according to the present invention are explained in detail below.

In a first embodiment, a power index is calculated at a module. The power index provides a user with a way to objectively determine a candidate module likely to be wastefully consuming significant power, even if the user does not understand how the circuit is working in detail; thereby improving efficiency in reviewing power consumption of a circuit under design.

Power consumption at a module includes the power consumed for data communication with another module, the power consumed when clock gating fails, and when unnecessary internal communication (communication between a local memory and a low-level module, for example) are conducted. Estimated power consumption obtained by simulation includes these two kinds of power consumption.

Figure 1:
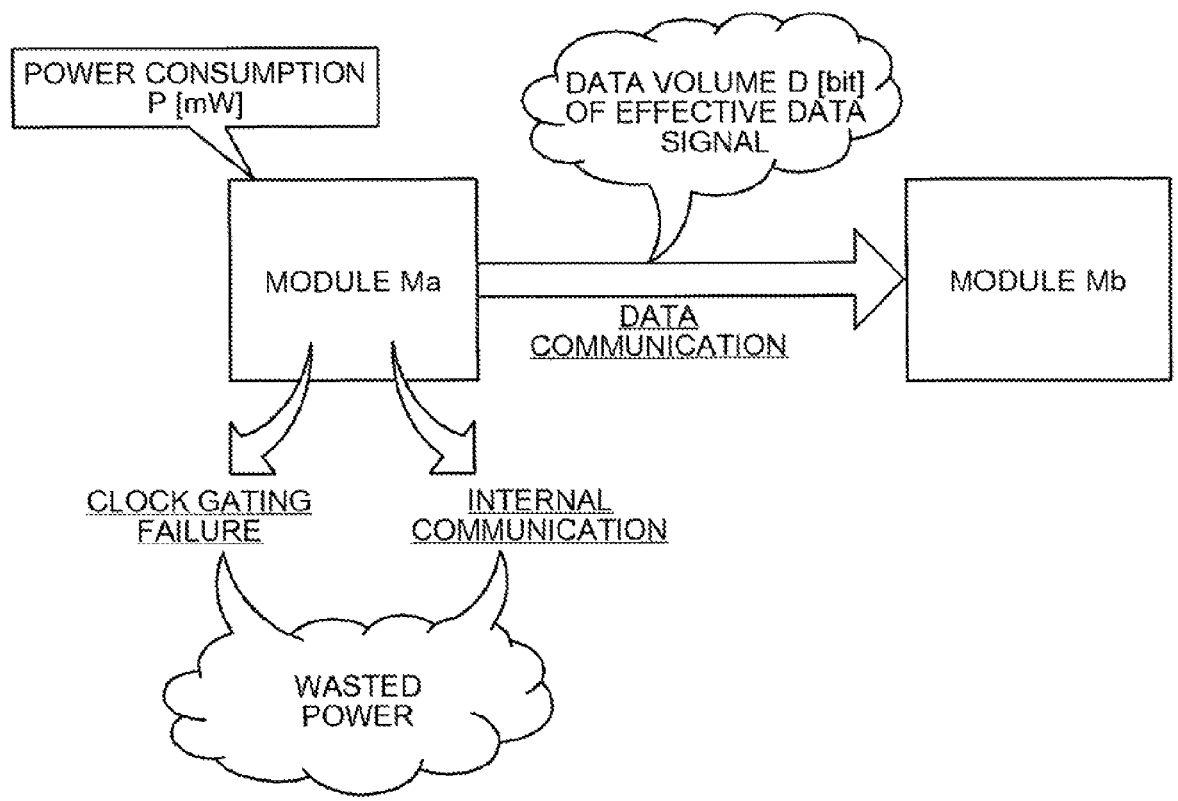
FIG. 1 is a diagram of power consumption at a module.

FIG. 1 is a diagram of power consumption at a module. A module Ma is a transmitting module that conducts data communication with a module Mb. Here, the estimated power consumption is P [mW] and the data volume conveyed by a data signal (hereinafter, effective data signal) sent from the module Ma to the module Mb is D [bit].

As depicted in FIG. 1, power consumption at the module Ma includes power consumption caused by failure to perform clock gating and by unnecessary internal communication as well as power consumption for the transmission of data signals to the module Mb. When measures to improve power consumption at the module Ma are performed, the wasted power resulting from failure to perform clock gating and from unnecessary internal communication is reduced enabling lower power consumption.

Therefore, with respect to the estimated power consumption P [mW], the higher the ratio of wasted power is, the worse the power efficiency at the module Ma is. In other words, with respect to the estimated consumption power P [mW], the higher the ratio of power consumption for data communication with the module Mb is, the better the power efficiency at the module Ma is.

Generally, power consumption for data communication between modules is proportional to the data volume of effective data signals. Consequently, in terms of power efficiency, the module Ma can be determined to be efficient or inefficient based on whether the module Ma transmits a data signal whose data volume is comparable to the power consumption P [mW].

In the first embodiment, a power index is defined as a quotient of the estimated power consumption P [mW] over the data volume D [bit] of effective data signals. A relatively larger power index indicates an inefficient utilization of power while a relatively smaller power index indicates a more efficient utilization of power.

A user relatively evaluates power indexes of modules of a circuit under design and identifies a candidate module that is a potential contributor to the wasting of power, thereby facilitating efficient and effective power consumption improvements.

Figure 2:
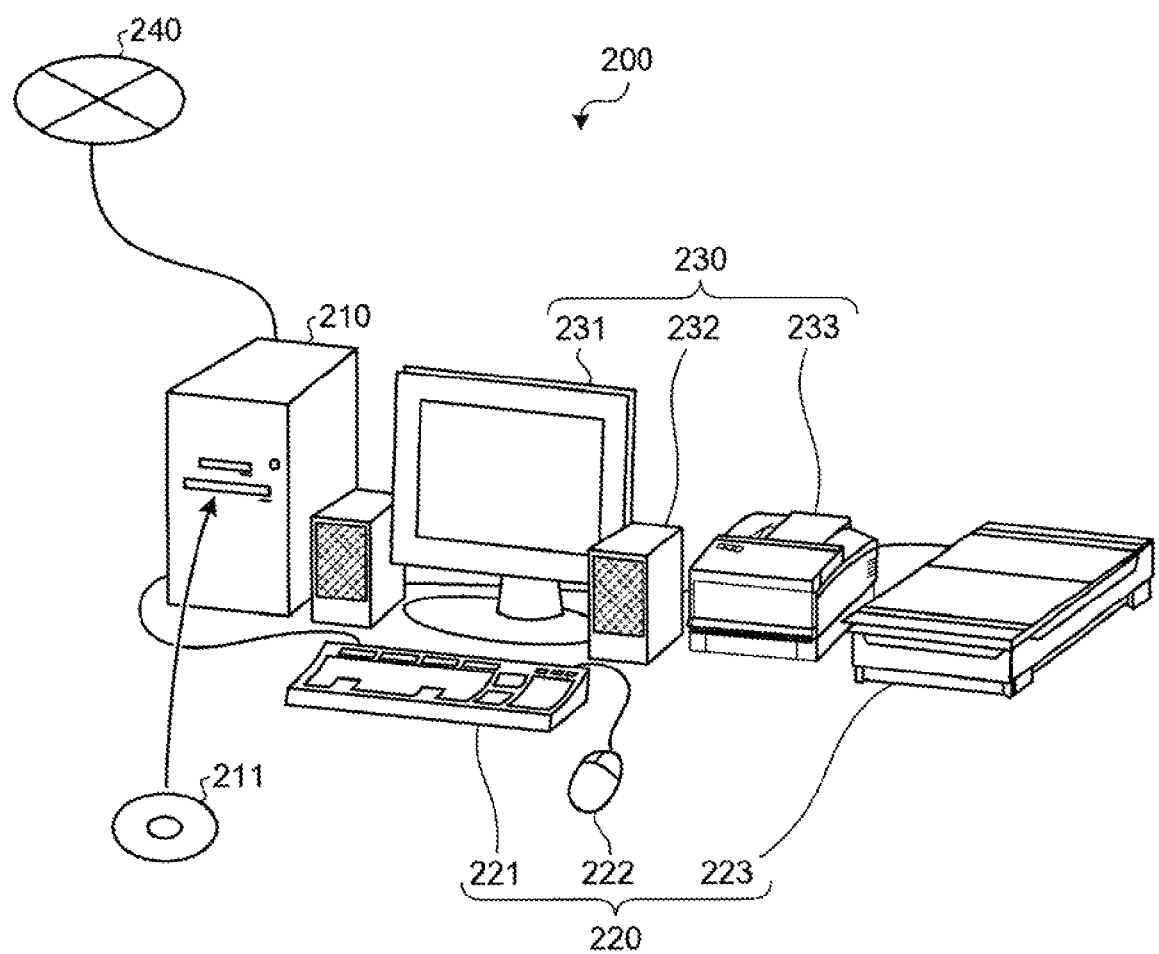
FIG. 2 is a diagram of a hardware configuration of a power index computing apparatus.

FIG. 2 is a diagram of a hardware configuration of a power index computing apparatus. As shown in FIG. 2, a power index computing apparatus 200 includes a computer 210, an input device 220, and an output device 230 and is connectable to a network 240 such as a local area network (LAN), wide area network (WAN), or the Internet via a router or a modem (not shown).

The computer 210 includes a central processing unit (CPU), a memory, and an interface. The CPU controls the entire power index computing apparatus 200. The memory includes a read-only memory (ROM), a random access memory (RAM), a hard drive (HD), an optical disk 211, and a flash memory. The memory is used as a work area of the CPU.

The memory stores various programs, which are loaded according to an instruction from the CPU. The reading/writing of data from and to the HD and the optical disk 211 are controlled by a disk drive. Further, the optical disk 211 and the flash memory are detachable from the computer 210. The interface controls input from input device 220, output to the output device 230, and transmission/reception to and from the network 240.

Further, the input device 220 includes a keyboard 221, a mouse 222, and a scanner 223. The keyboard 221 includes keys to input text, numerals, and various instructions. Further, the input device 220 can be a touch panel type device. The mouse 222 moves a cursor, determines an area, moves a window, or changes the dimensions for the window. The scanner 223 optically scans an image. The scanned image is imported as image data and stored in the memory of the computer 210. The scanner 223 can have an optical character recognition (OCR) function.

Further, the output device 230 includes a display 231, a printer 232, and a speaker 233. The display 231 displays a cursor, icons, toolboxes, and data such as documents, images, and function information. The speaker 233 outputs sound such as a sound effect, a read-out voice, and the like. The printer 232 outputs image date and document data.

Figures 3, 4:
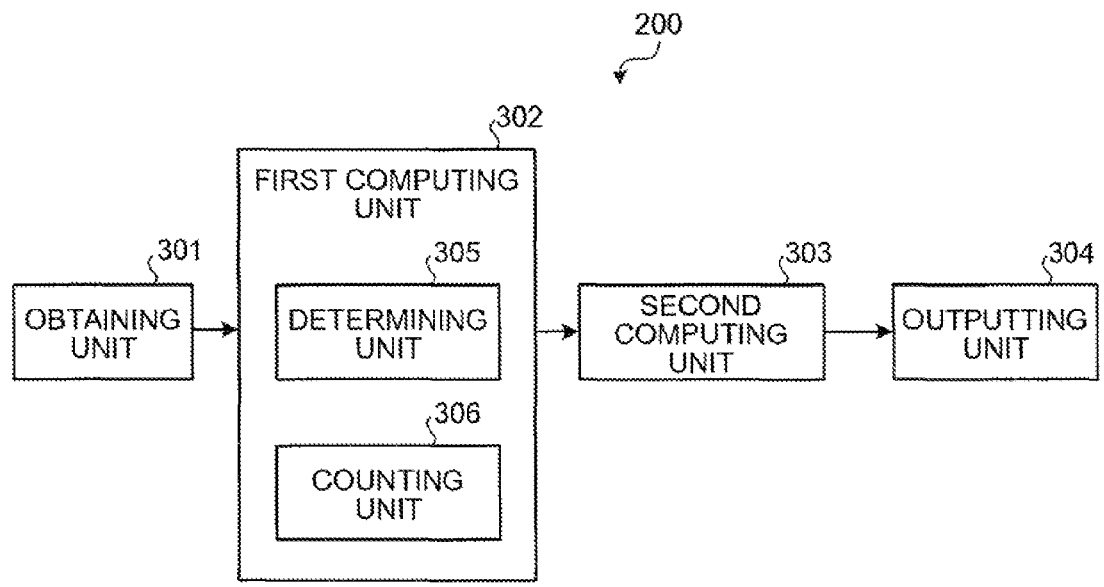
FIG. 3 is a functional diagram of the power index computing apparatus.
FIG. 4 is a diagram of a power consumption list.

FIG. 3 is a functional diagram of the power index computing apparatus. As depicted in FIG. 3, the power index computing apparatus 200 includes an obtaining unit 301, a first computing unit 302, a second computing unit 303, an output unit 304, a determining unit 305, and a counting unit 306.

The obtaining unit 301, the first computing unit 302, the second computing unit 303, the output unit 304, the determining unit 305, and the counting unit 306 that function as a control unit are implemented by, for example, an execution of programs stored in a storage unit such as the ROM, RAM, HD, optical disc 211, or flash memory shown in FIG. 2, the programs being executed by the CPU, or may be implemented by the input/output I/F. Data output from each of the units (the obtaining unit 301, the first computing unit 302, the second computing unit 303, the output unit 304, the determining unit 305, and the counting unit 306) is stored in the storage unit.

As depicted in FIG. 3, a unit at the head of an arrow reads out from the storing unit the data output from a unit at the tail of an arrow and causes the CPU to execute a program for the unit at the head of an arrow.

The obtaining unit 301 obtains estimated power consumption for a transmitting module in the circuit. The estimated power consumption for a transmitting module may be obtained from, for example, an external source (not shown) or by user input, or may be extracted from a database or library (not shown).

Further, the estimated power consumption may be obtained from a simulation where power consumption at each module is estimated by a conventional estimation method.

FIG. 4 is a diagram of a power consumption list. As depicted in FIG. 4, a power consumption list 400 includes power consumption information items 400-1 to 400-m that indicate estimated power consumption for modules M1 to Mm in a circuit under design. The power consumption information items 400-1 to 400-m respectively correspond to modules M1 to Mm, and indicate module name and estimated power consumption.

For example, the power consumption information item 400-i indicates that the estimated power consumption of a module M1 is Pi [mW]. The obtaining unit 301 obtains, for example, the power consumption list 400 (power consumption information items 400-1 to 400-m) as the estimated power consumption of a transmitting module.

The first computing unit 302 computes the data volume of effective data signals received by a receiving module that communicates with the transmitting module, an effective signal being among the signals transmitted from the transmitting module. The data volume of the effective data signals is the data volume of data signals transmitted and received between modules connected through a module interface.

When the data volume of an effective data signal increases, the ratio of power consumption for data communication with the receiving module increases with respect to the estimated power consumption of the transmitting module. The data volume of an effective data signal can be expressed by, for example, the number of bits of the effective data signal (data size). A detailed explanation of a computing process of the first computing unit 302 is described hereinafter.

The second computing unit 303 uses the estimated power consumption obtained by the obtaining unit 301 and the data volume computed by the first computing unit 302, and computes a power index indicative of the power consumed for transmission of effective data signals with respect to the estimated power consumption.

The power index is an index for determining whether the workload of the transmitting module is comparable to the estimated power consumption of the transmitting module. Here, the power index is computed to determine whether the transmitting module transmits effective data signals whose data volume is comparable to the estimated power consumption.

The second computing unit 303 computes a power index for each transmitting module according to equation (1) below where Xi is a power index, Pi is the estimated power consumption of a transmitting module Mi, and Di is the volume of effective data.

$$Xi = Pi/Di \quad (1)$$

As the power index Xi increases, the ratio of power consumption for the transmission of effect signals with respect to the estimated power consumption Pi increases. In other words, the larger the power index Xi is, the more wasteful the power consumption is at the transmitting module Mi.

On the other hand, as the power index Xi decreases, the ratio of power consumption for the transmission of effective data signals with respect to the estimated power consumption Pi decreases. In other words, the smaller the power index Xi is, the less wasteful the power consumption is at the transmitting module Mi.

Hence, by selecting a transmitting module Mi whose power index Xi is relatively large as a subject of power consumption improvement to lower power consumption, power consumption can be improved effectively and efficiently since a significant reduction in power consumption is obtained.

Computation of the power index is not limited to the example above. For example, a power index of a transmitting module may be defined as a quotient of the data volume of effective data signals of a transmitting module over the estimated power consumption. In this case, a relatively larger power index indicates less wasteful power consumption at the transmitting module. On the other hand, a relatively smaller power index indicates more wasteful power consumption at the transmitting module.

The output unit 304 outputs the computation result obtained by the second computing unit 303. The form of output from the output unit 304 may be screen display at the display 231, printout at the printer 233, data output to memory (save), or transmission to an external computer apparatus. Concrete examples of the output from the output unit 304 are described hereinafter.

A computation process of the first computing unit 302 is explained in detail. The data volume of effective data signals is computed based on, for example, (1) a simulation result that indicates, for each clock cycle, control signals whose values change during the clock cycle, and (2) an interface table that defines, for each module interface, control conditions for data communication to be established between modules.

The simulation result and the interface table may be obtained by the obtaining unit 301 from an external source, or may be obtained by user input or from a database or library (not shown).

The simulation result may be an electronic file such as a value change dump (VCD) file in which a clock cycle is associated with control signals whose value has changed during the clock cycle. The interface table can be extracted from, for example, a specification describing functions of modules or circuit information for a circuit under design described by hardware description language (VHDL, Verilog, etc.).

FIG. 5 is a diagram of an example of a simulation result. As depicted in FIG. 5, a simulation result 500 includes signal information items 500-1 to 500-n that indicate signals whose values changed while the application was running.

The signal information items 500-1 to 500-n indicate signals whose values changed during clock cycles 1 to n. For example, signal information item 500-j indicates that at a clock cycle j, a value of a data signal WDATA changed to three and a value of a control signal RECV changed to zero.

Here, the simulation result 500 indicates, for each clock cycle, only the signals whose values have changed; however, the values of other signals at the previous clock cycle are retained as well, i.e., the simulation result 500 retains the values of all signals at each clock cycle.

FIG. 6 is a diagram of an interface table. As depicted in FIG. 6, an interface table 600 includes, for each module interface C1 to Ct, module interface information items 600-1 to 600-t that define the passing of data signals between modules.

The interface information items 600-1 to 600-t include, respectively for the module interfaces C1 to Ct, information concerning an interface name, a transmitting module name, a receiving module name, a control condition, a data signal, the number of bits, and a priority level. The interface name is a name of the module interface C1 to Ct that connects modules.

The transmitting module name is the name of a transmitting module. The receiving module name is the name of a receiving module. The control condition is a condition under which data communication between modules can be established. The data signal is an effective data signal to be transmitted and received. The number of bits is the data size of a data signal. The priority level is an index indicating the importance of a data signal.

Figure 7:
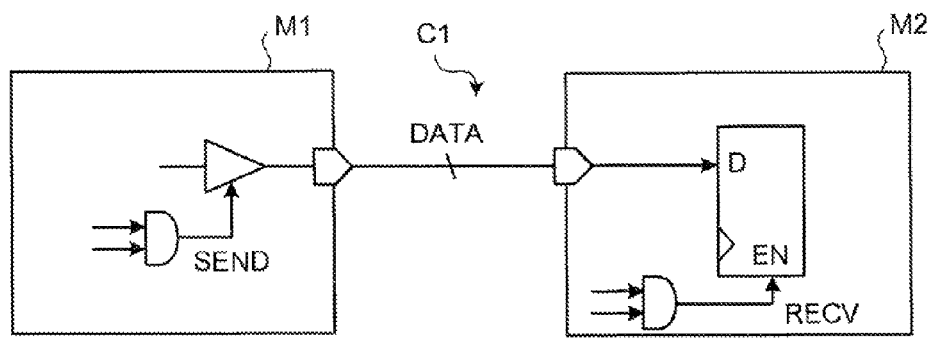
FIG. 7 is a diagram outlining data communication between modules.

Data communication between modules is explained with respect to the interface information item 600-1. FIG. 7 is a diagram outlining data communication between modules. As depicted in FIG. 7, a transmitting module M1 and a receiving module M2 are connected through a module interface C1.

The interface information item 600-1 includes a control condition SEND&RECV under which data communication between the transmitting module M1 and the receiving module M2 connected via the module interface C1 is established. This control condition indicates that when control signals SEND and RECV both change, data communication between the transmitting module M1 and the receiving module M2 is established.

The transmitting module M1 transmits a data signal DATA [63:0] when the control signal SEND changes from 0 to 1. The receiving module M2 receives the data signal DATA [63:0] when a control signal RECV changes from 0 to 1. Here, [63:0] defines the number of bits.

The transmitting module M1 stops transmission of the data signal DATA [63:0] when the control signal SEND changes from 1 to 0. The receiving module M8 stops reception of the data signal DATA [63:0] when the control signal RECV changes from 1 to 0.

The priority level of the data signal DATA [63:0] is 1. A value of 1 is the minimum priority level. A data signal ERROR included in interface information item 600-k has a priority level of 1000 meaning that the data signal ERROR is 1000 times more important than the data signal DATA [63:0].

The determining unit 305, for each module interface, determines whether a control signal that has changed during one or multiple clock cycles and a control signal that is defined in a control condition match. For example, the determining unit 305 determines whether control signals match based on the signal information items 500-1 to 500-n depicted in FIG. 5 and the interface information items 600-1 to 600-t.

Here, for the module interface C1, it is determined whether control signals identified from the signal information items 500-1 to 500-n match the control signals SEND and RECV that are defined in the control condition SEND&RECV. Sequentially, for each clock cycle 1 to n, it is determined whether respective control signals match.

According to the signal information item 500-1, the control signal SEND changed from 0 to 1 at clock cycle 1. In this case, the determining unit 305 determines that among the control signals defined in the control condition SEND&RECV, only the control signal SEND and the control signal SEND identified from the signal information item 500-1 match.

Next, according to the signal information item 500-2, the control signal RECV has changed from 0 to 1 at clock cycle 2. In this case, the determining unit 305 determines that the control signals SEND and RECV, whose signal values have changed at clock cycle 1 and 2, and the control signals SEND and RECV defined in the control condition SEND&RECV match.

When multiple control signals are defined in a control condition as described above, information that identifies control signals already determined to match may be stored in the ROM or RAM until all control signals match control signals defined in the control condition (or processes for all clock cycles are completed).

The counting unit 306 counts how many times the determining unit 305 determines that control signals match; namely, the number of times control conditions are met. In the example above, the counting unit 306 increments the number of times the control condition SEND&RECV of the module interface C1 is met when the determining unit 305 determines that the control signals SEND and RECV match those defined in the control condition.

As described above, the determining unit 305 determines, for example, for each module interface C1 to Ct indicated in the interface information 600-1 to 600-t, whether respective control signals at each clock cycle indicated in the signal information 500-1 to 500-n match those defined in a respective control condition. The counting unit 306 counts how many times a control condition is met each time the determining unit 305 determines that control signals match.

The first computing unit 302 computes the data volume of effective data signals of the transmitting module based on a result of the counting by the counting unit 306 and on the number of bits of the effective data signal transmitted and received when a control condition is met.

The result of the counting by the counting unit 306 indicates how many times control conditions are met.

For example, the data volume of the effective signals can be computed for each transmitting module according to equation (2) below where F is the number of times a control condition is met, and B is the number of bits of the effective data signal transmitted and received when the control condition is met.

$$Di = F \times B \quad (2)$$

The result of the counting is multiplied by the number of bits of the effective data signal transmitted and received when a control condition is met so that for each transmitting module, the total data volume for the effective data signals that have been transmitted to the receiving module from the beginning to the end of the simulation is obtained.

For example, here, a control condition SEND&RECV has been met 10 times (the result of the counting is 10). As the number of times the condition is met is 10 and the number of bits of the effective data signal is 64, substitution of these values into equation (2) gives the data volume of the effective signals of the transmitting module M1, which is 640 [bits].

In this way, the data volume of the effective data signals passed through module interfaces C1 to Ct is obtained for each interface C1 to Ct. In other words, the data volume of the effective data signals is obtained based on the number of times effective data has been transmitted (the result of the counting) and on the data size (the number of bits).

The first computing unit 302 may compute the data volume for each transmitting module based on a priority level of the effective data signal transmitted and received. Thereby, effective data signals with a high priority are weighted, i.e., the data volume of effective data signals is computed based not only on the data volume but also on the priority level of the effective data signal.

As explained above, the data volume of effective data signals corresponds to a workload of the transmitting module. For example, a data signal ERROR in the interface information 600-k indicates that failure has occurred in some process, and is a very importance signal. In this case, the workload is evaluated not only by the number of bits but also by the priority level of the effective data signal.

A data volume of effective data signals for each transmitting module is computed according to equation (3) below where I is the priority level of an effective data signal transmitted and received when a control condition is met.

$$Di = F \times B \times I \quad (3)$$

A product of a result of the counting performed for each control condition and the number of bits of the effective data signal transmitted and received when a control condition is met is further multiplied by the priority level of the effective data signal; whereby the priority level of the data signal is taken into account and the data volume is obtained.

For example, here, the number of times a control condition ERROR.rise of a module interface Ck is met is 1. As the number of times the control condition is met is 1, the number of bits of an effective data signal is 1, and the priority level is 1000, substitution of these values into equation (3) gives the data volume of effective data signals of the transmitting module M1, which is 1000 [bits].

In this way, the priority level of an effective data signal transmitted from a transmitting module to a receiving module is taken into account and the data volume of effective data signals is obtained. The control signal ERROR.rise indicates a case when a transmitting module M7 transmits a data signal ERROR when a control signal ERROR changes from 0 to 1.

Figure 8:
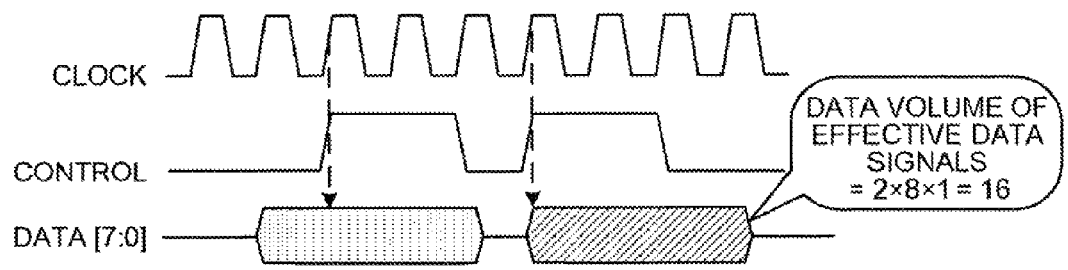
FIG. 8 is a diagram of an effective data signal.

FIG. 8 is a diagram of an effective data signal. As depicted in FIG. 8, a control condition is CONTROL.rise, a data signal is DATA [7:0], and a priority level is 1.

When a control signal CONTROL changes from 0 to 1, a transmitting module transmits the data signal DATA [7:0] whose priority level is 1. In this case, as the number of times a control condition is met is 2, the number of bits of the data signal is 8, and the priority level is 1, substitution of these values into equation (3) gives the data volume of the effective data signals of the transmitting module, which is 16 [bits].

Figure 9:
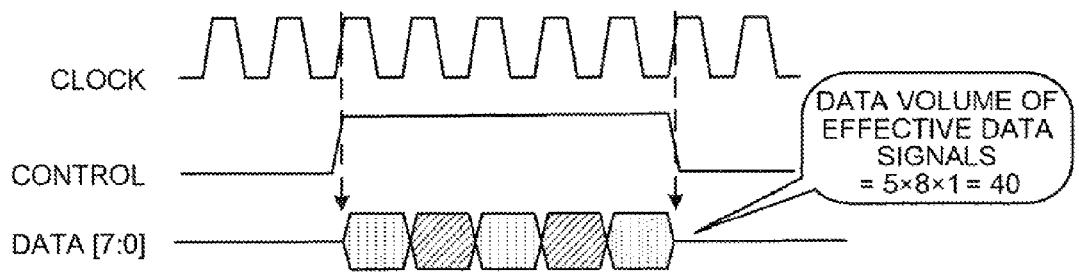
FIG. 9 is another diagram of an effective data signal.

FIG. 9 is another diagram of an effective data signal. As depicted in FIG. 9, a data signal DATA[7:0] whose priority level is 1 is transmitted every clock cycle during a period when a control signal CONTROL is 1 (a burst transmission).

The data volume of the effective data signals of the transmitting module is 40 [bits] when the number of times that a control condition is met is 5, the number of bits of the data signal is 8, and the priority level is 1, and the respective values are substituted into equation (3).

When multiple control signals are defined in a control condition, the determining unit 305 may determine whether a control signal among the multiple control signals and a control signal whose value changed during a clock cycle match.

For example, the determining unit 305 may determine whether a control signal whose value changed during a clock cycle and, a control signal used for the transmitting module to send an effective data signal or a control signal used for the receiving module to receive the effective data signal match.

In the case of the module interface C1, the determining unit 305 determines whether a control signal whose value changed during a cycle clock and, the control signal SEND or the control signal RECV defined in the control condition SEND&RECV match.

When the control signal whose value changed and the control signal SEND match, it is determined that the control signal whose value changed and a control signal SEND&RECV defined in the control condition SEND&RECV match.

Even when multiple control signals are defined in a control condition, the determining unit 305 completes a determining process once one of the control signals matches a control signal whose value changed. This configuration eliminates the necessity of performing a determining process over multiple clock cycles, thereby reducing the time for the determining process.

When a control condition is met over consecutive clock cycles, e.g., a first clock cycle and a second clock cycle, the determining unit 305 may determine whether the value of the effective data signal at the first clock cycle matches the value of the effective data signal at the second clock cycle. Under this configuration, the counting unit 306 may count the number of times the control condition is met when the determining unit 305 determines the values do not match.

Namely, even when a control condition is met over multiple clock cycles, the number of times the control condition is met is 1 when the values of data signals are equal. In this way, power consumed in the transmission of effective data signal is estimated precisely.

Figures 10, 11:
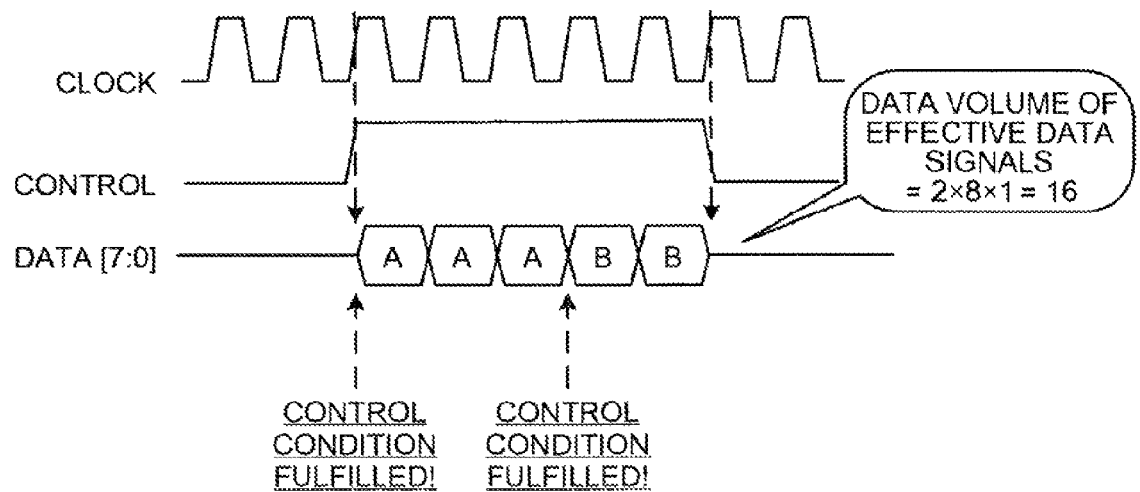
FIG. 10 is another diagram of an effective data signal.
FIG. 11 is a diagram of output from the first computing unit.

FIG. 10 is another diagram of an effective data signal. As depicted in FIG. 10, a data signal DATA [7:0] whose priority level is 1 is transmitted during a period when a control signal CONTROL is 1. Symbols A and B in FIG. 10 represent values of the data signal DATA [7:0].

In this case, when data signals that have the same value are transmitted, the number of times a control condition is met is counted as 1. Here, as the number of times the control condition is met is 2, the number of bits of the data signal is 8, and the priority level is 1, substitution of these values into equation (3) gives an effective data volume of the transmitting module, which is 16 [bits].

FIG. 11 is a diagram of output from the first computing unit. As depicted in FIG. 11, a list 1100 of effective data volumes includes, respectively corresponding to the transmitting modules, computation results 1100-1 to 1100-m from the first computing unit 302. For example, for a computation result 1100-i, the data volume of effective data signals for a transmitting module Mi is Di.

The data volume of effective data signals for each transmitting module is given as a product of the number of times a control condition is met and the number of bits of the data signal (additionally, the priority level of the data signal). However, computation of data volume is not limited hereto.

For example, the number of bits of the data signal (or a product of the number of bits and the priority level) may be summed each time a control condition is met at each clock cycle; whereby the effective data volume for each transmitting module is obtained.

This example is explained in more detail. An array variable D[1, 2, ..., m] is prepared to store an effective data volume for the modules M1 to Mm in a circuit under design; namely, D[i] indicates an effective data volume of a module M1 (i=1, 2, ..., m). As an initial setting, an effective data volume is initialized (D[ ]=0).

With these D[ ], the data volume of effective signals for each transmitting module is computed. In other words, it is determined, at each clock cycle 1 to n, whether a control condition for each module interface C1 to Ct is met.

Each time a control condition is met, the effective data volume increases by an increment x and by adding the increments x each time a control condition is met, the data volume of effective data signals for each transmitting module can be computed. An increment x is given according to equation (4) or (5) below.

$$x=B \quad (4)$$

$$x=B \times I \quad (5)$$

In equation (4), the increment x is expressed by the number of bits B of an effective data signal. In equation (5), the increment x is expressed by a product of the number of bits B and the priority level I of an effective data signal.

The obtaining unit 301 may obtain a simulation result that indicates the data volume of effective data signals for each transmitting module. The simulation result includes beforehand information concerning the data volume of effective data signals for each transmitting module. Such a simulation result is obtained when a script that monitors the data volume of effective data signals for each transmitting module is written in an execution tool of the simulation.

Figures 12, 13:
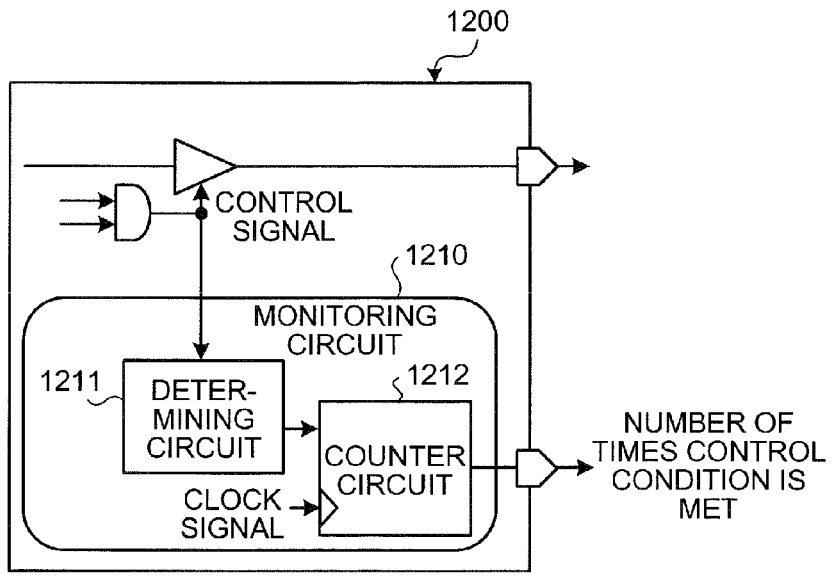
FIG. 12 is a diagram of one example of a monitoring circuit.
FIG. 13 is a diagram of output results.

A circuit may include a function of monitoring the data volume of effective signals for each transmitting module to obtain such a simulation result. For example, a monitoring circuit that measures the number of times a control condition is met is added to the circuit under design. FIG. 12 is a diagram of one example of a monitoring circuit. As depicted in FIG. 12, a monitoring circuit 1210 that monitors the number of times a control condition of a module interface is met is added to a circuit 1200 that is a subject of a simulation.

The monitoring circuit 1210 includes a determining circuit 1211 and a counter circuit 1212. The determining circuit 1211 determines whether a control signal whose value changed at a clock cycle and a control signal in the control condition match. The counter circuit 1212 counts the number of times the control condition is met when the determining circuit 1211 determines that the control signals match. The data volume of effective data signals for each transmitting module is computed based on the number of times the control condition is met as output from the monitoring circuit 1210.

In this case, the second computing unit 303 computes a power index for each transmitting module based on the simulation result that indicates the data volume of effective data signals for each transmitting module and is obtained by the obtaining unit 301. In this way, a computation by the first computing unit 302 is omitted and thus the computation of power indices becomes faster.

The output unit 304 may output a power index for each transmitting module in a circuit under design. For example, the output unit 304 outputs a table that correlates and lists names and power indices of transmitting modules. A designer sees the table and can relatively evaluate the power indices of transmitting modules in the circuit under design.

Further, the output unit 304 may output only the power indices that are more than or equal to a predetermined threshold; namely, the power indices of modules that are likely to contribute significantly to an improvement in power consumption are output. A user can set the threshold freely by, for example, operating the input device 220 such as the keyboard 221 and the mouse 222.

The output unit 304 may correlate and output a power index and an estimated power consumption of a transmitting module. For example, the output unit 304 outputs a table that correlates and lists names, indices, and the estimated power consumption of transmitting modules.

A designer reviews the table and can relatively evaluate the power indices and the estimated power consumption of each transmitting module.

Further, the output unit 304 may output power indices in ascending order or descending order after a sorting unit (not shown) sorts, in ascending order or descending order, power indices computed by the second computing unit 303.

FIG. 13 is a diagram of output results. As depicted in FIG. 13, an output result list 1300 indicates output result items 1300-1 to 1300-12 concerning transmitting modules M1 to M12 of the circuit under design.

The output result items 1300-1 to 1300-12 indicate power indices, effective data volumes, and estimated power consumption concerning transmitting modules M1 to M12. For example, although a transmitting module M5 has the highest power consumption 34.29 [mW], the power index 1.06 [mW/bit] thereof is the fifth largest.

With the list, the power indices of the transmitting modules M1 to M12 can be evaluated relatively and a candidate that is likely to be wasting power can be identified. Since the transmitting module M10 has the highest power index and the second highest estimated power consumption, it is highly possible that M10 is wastefully consuming significant power.

Figure 14:
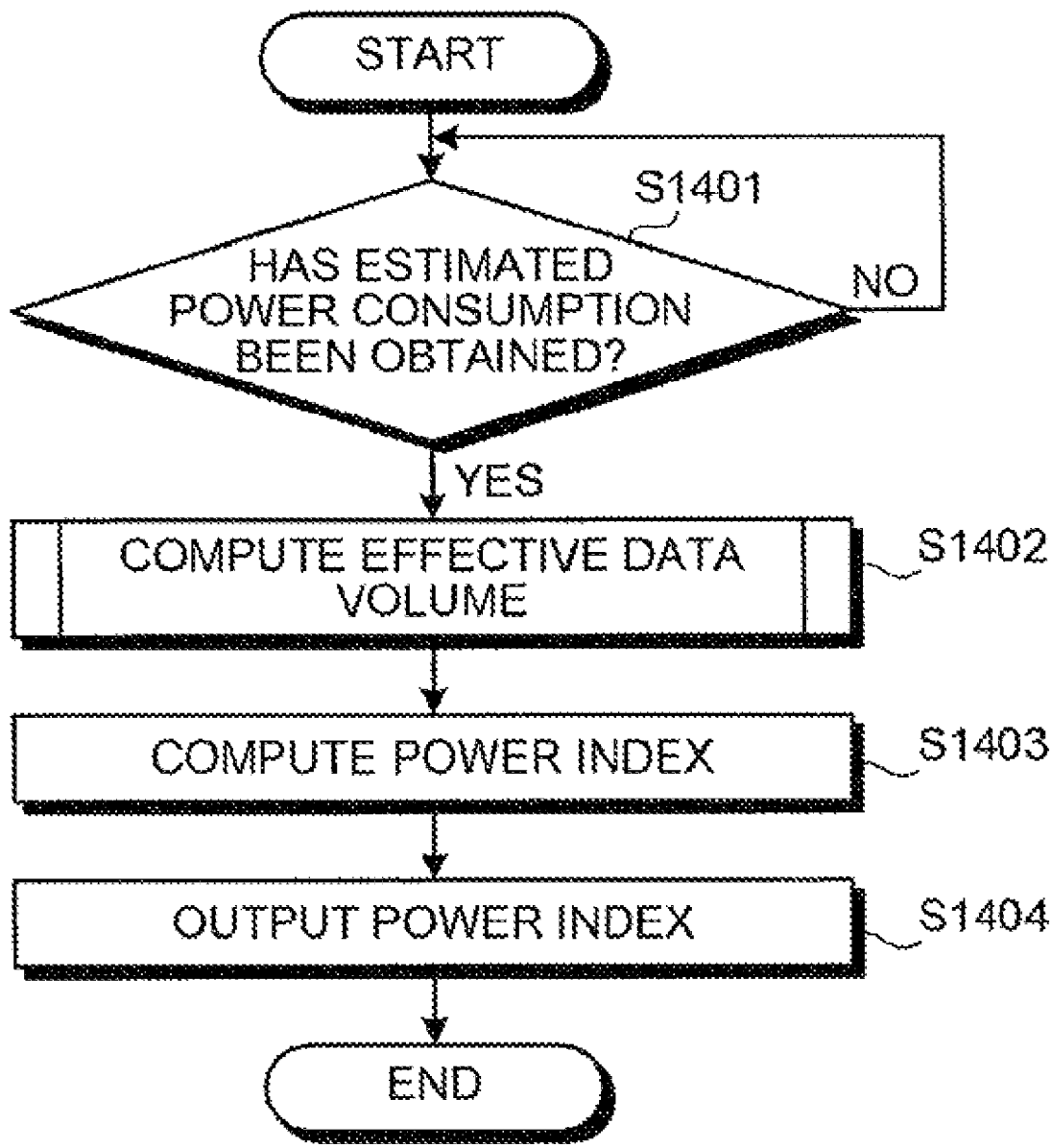
FIG. 14 is a flowchart of computation of a power index.

FIG. 14 is a flowchart of computation of a power index. According to the flowchart depicted in FIG. 14, it is determined whether the obtaining unit 301 has obtained estimated power consumption for a transmitting module of the circuit under design (step S1401).

Waiting occurs until the estimated power consumption is obtained (step S1401: NO). Once the estimated power consumption is obtained (step S1401: YES), the first computing unit 302 executes an effective data volume computing process to compute the data volume of effective data signals that are transmitted from a transmitting module and are received by a receiving module communicating with the transmitting module (step S1402).

Based on the estimated power consumption obtained by the obtaining unit 301 and the data volume computed by the first computing unit 302, the second computing unit 303 computes a power index concerning the power consumed for the transmission of the effective data signals with respect to the estimated power consumption (step S1403).

The output unit 304 outputs the result from the second computing unit 303 (step S1404), and a series of the process is terminated.

In this way, wastefully consumed power, exclusive of the power consumed in the transmission of effective data signals, with respect to the estimated power consumption can be estimated.

A detailed process of computing an effective data volume at step S1402 in FIG. 14 is explained. Hereinafter, a clock cycle is expressed as clock cycle j (j=1, 2, . . . , n).

Figure 15:
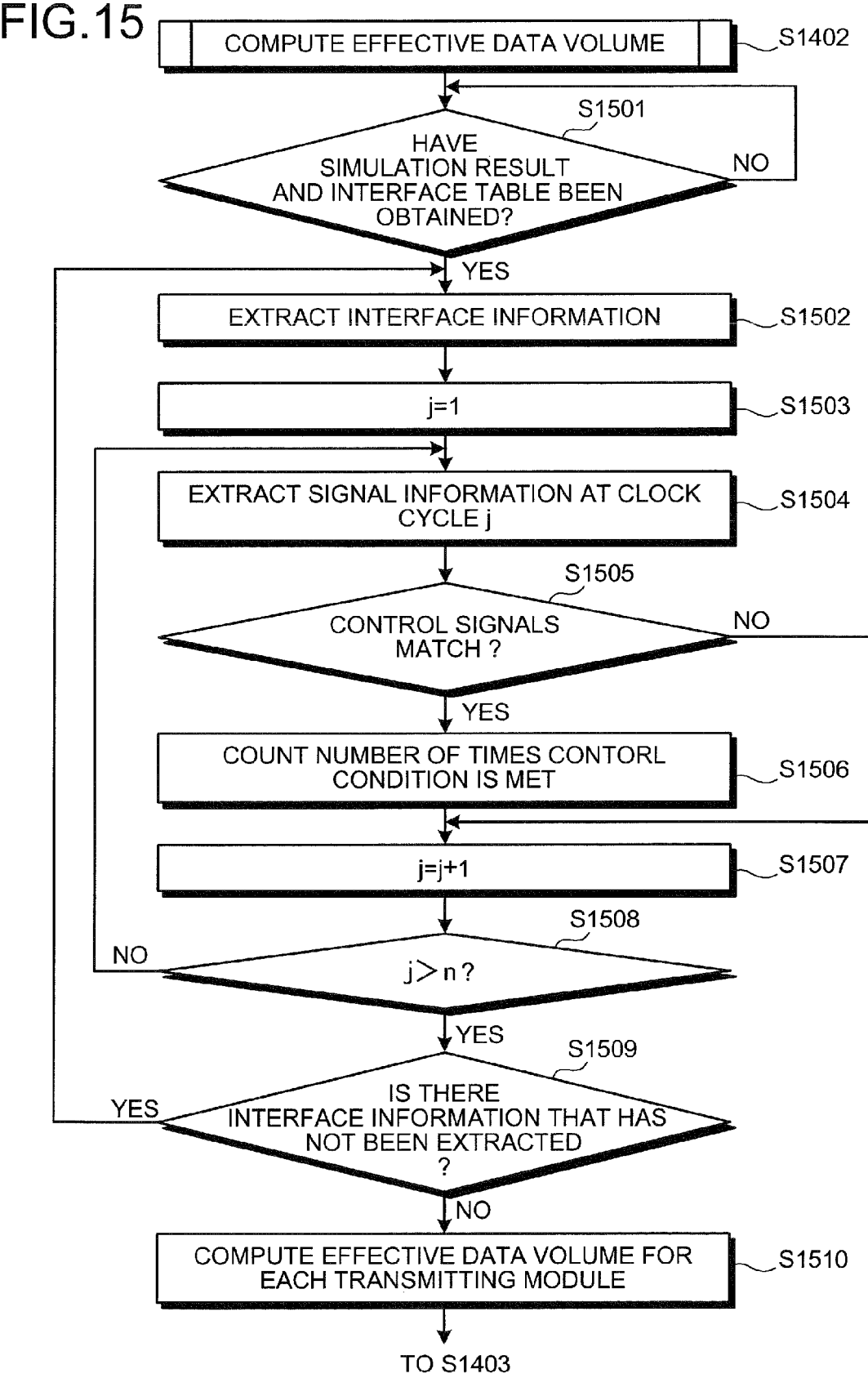
FIG. 15 is a flowchart of one example of an effective data volume computation process.

FIG. 15 is a flowchart of one example of an effective data volume computation process. According to the flowchart depicted in FIG. 15, it is determined whether the obtaining unit 301 has obtained the simulation result 500 and the interface table 600 (step S1501).

Waiting occurs until the simulation result 500 and the interface table 600 are obtained (step S1501: NO). Once the simulation result 500 and the interface table 600 are obtained (step S1501: YES), interface information 600-1 to 600-t for an arbitrary module interface is extracted from the interface table 600 (step S1502).

Variable j is set to 1 (step S1503) and signal information 500-1 to 500-n for a clock cycle j is extracted from the simulation result 500 (step S1504).

Based on the interface information 600-1 to 600-t and the signal information 500-1 to 500-n extracted at steps S1502 and S1504, the determining unit 305 determines whether a control signal whose value has changed at the clock cycle j and a control signal defined in a control condition match (step S1505).

If the control signals match (step S1505: YES), the counting unit 306 counts how many times the control condition defined in the interface information 600-1 to 600-t extracted at step S1502 is met (step S1506), and j is incremented (step S1507). If the control signals do not match (step S1505: NO), the flow goes to step S1507.

It is determined whether j>n (step S1508). If j is not more than n (step S1508: NO), the flow returns to step S1504 and the steps therefrom are repeated. If j is more than n (step S1508: YES), it is determined whether there is interface information 600-1 to 600-t that has not yet been extracted (step S1509).

If there is interface information 600-1 to 600-t that has not yet been extracted (step S1509: YES), the flow returns to step S1502 and the steps therefrom are repeated.

If all of the interface information 600-1 to 600-t has been extracted (step S1509: NO), the first computing unit 302 computes the data volume of effective data signals for each transmitting module based on the counting result at step S1506 and the interface information 600-1 to 600-t (step S1510), and the flow goes to step S1403 depicted in FIG. 14.

When multiple control signals are defined in a control condition, the determining unit 305 may determine whether all control signals defined and value-changed signals match, or whether one of control signals and a value-changed signal match.

A process of computing the data volume of effective data signals is explained below with an array variable D [1, 2, . . . , m] that stores effective data volumes of modules M1 to Mm. Hereinafter, a clock cycle is written as clock cycle j (j=1, 2, . . . , n) and a module interface is written as module interface Ck (k=1, 2, . . . , t).

Figure 16:
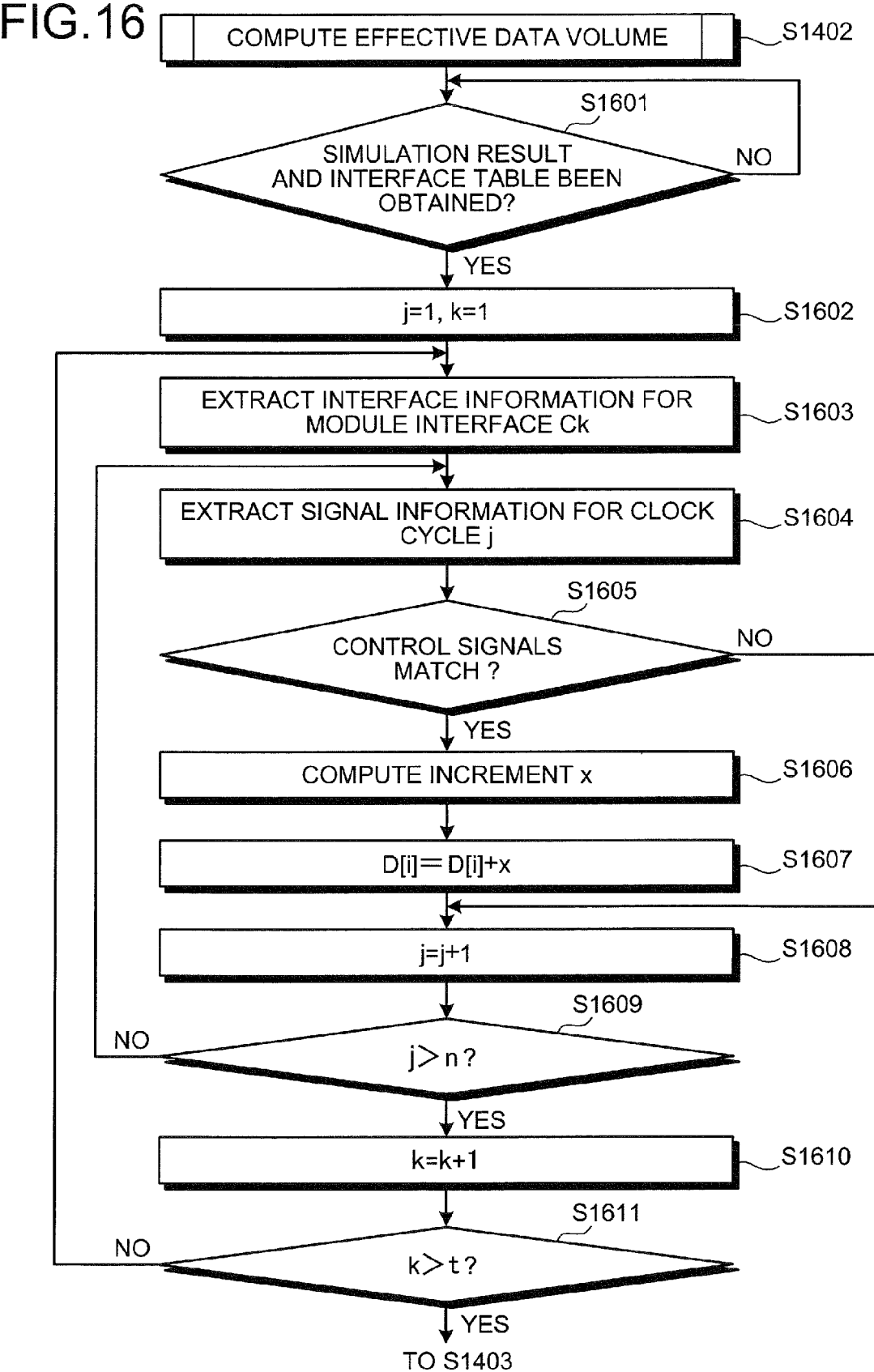
FIG. 16 is a flowchart of another example of an effective data volume computation process.

FIG. 16 is a flowchart of another example of an effective data volume computation process. As depicted in FIG. 16, it is determined whether the obtaining unit 301 has obtained a simulation result 500 and an interface table 600 (step S1601).

Waiting occurs until the simulation result and the interface table are obtained (step S1601: NO). Once the simulation result and the interface table are obtained (step S1601: YES), variables are initialized as j=1 and k=1 (step S1602).

The interface information 600-1 to 600-t for a module interface Ck is extracted from the interface table 600 (step S1603). The signal information 500-1 to 500-n for clock cycle j is extracted from the simulation result 500 (step S1604).

Based on the interface information 600-1 to 600-t and the signal information 500-1 to 500-n extracted at steps S1603 and 1604, the determining unit 305 determines whether a control signal whose value has changed at clock cycle j and a control signal defined in a control condition match (step S1605).

If the control signals match (step S1605: YES), the first computing unit 302, using equations (4) or (5), computes an increment x of the effective data volume of a transmitting module Di specified by the interface information 600-1 to 600-t extracted at step S1603 (step S1606), and D[i]+x is substituted in D[i] (D[i]=D[i]+x) (step S1607).

Variable j is incremented (step S1608), and it is determined whether j is more than n (step S1609). If j is not more than n (step S1609: NO), the flow returns to step S1604 and the steps therefrom are repeated. If j is more than n (step S1609: YES), k is incremented (step S1610) and it is determined whether k is more than t (step S1611).

If k is not more than t (step S1611: NO), the flow returns to step S1603 and the steps therefrom are repeated. If k is more than t (step S1611: YES), the flow goes to step S1403 depicted in FIG. 14.

When a control condition is met at contiguous clock cycles j−1 and j, it may be determined whether a value of an effective data signal received/transmitted during clock cycle j−1 matches a value of an effective data signal received/transmitted during clock cycle j. In this case, the flow goes to step S1606 when the values do not match and goes to step S1608 when the values match.

As explained above, according to the first exemplary embodiment, a power index can be computed. The power index enables estimation of wasted power that is not consumed for data communication between modules with respect to estimated power consumption in a module of a circuit under design. The power index can be expressed using a data volume of effective data signals transmitted and received between modules.

In this way, even if a user does not know in detail how a circuit operates, a candidate of module that is likely to be wasting significant power is objectively identified. As a result, a power improving operation aiming at a potential power wasting module can be performed effectively and efficiently, thereby reducing workload and shortening the circuit design period.

In the first embodiment, the power index is computed based on the data volume of effective data signals for each module M1 to Mm. In a second embodiment, a power index is computed based on entropy of each module M1 to Mm. For elements common between the first and second exemplary embodiments, identical numerals or symbols are used, and explanations thereof are omitted.

Figures 17, 18, 19:
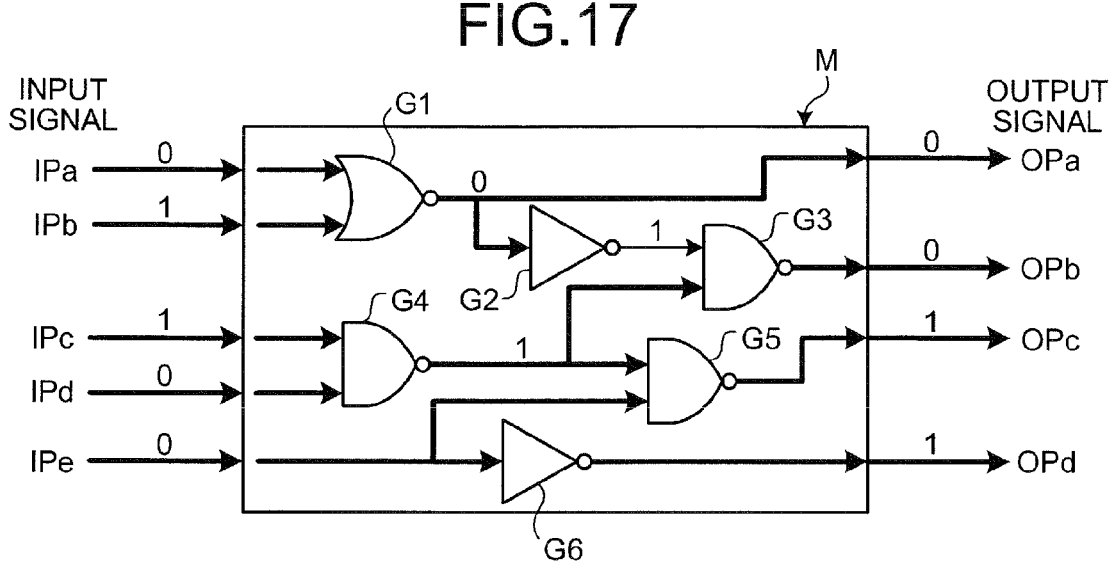
FIG. 17 is a diagram of one example of input/output signals of a module.
FIG. 18 is diagram of another example of a simulation result.
FIG. 19 is diagram of another example of an interface table.
Figure 22:
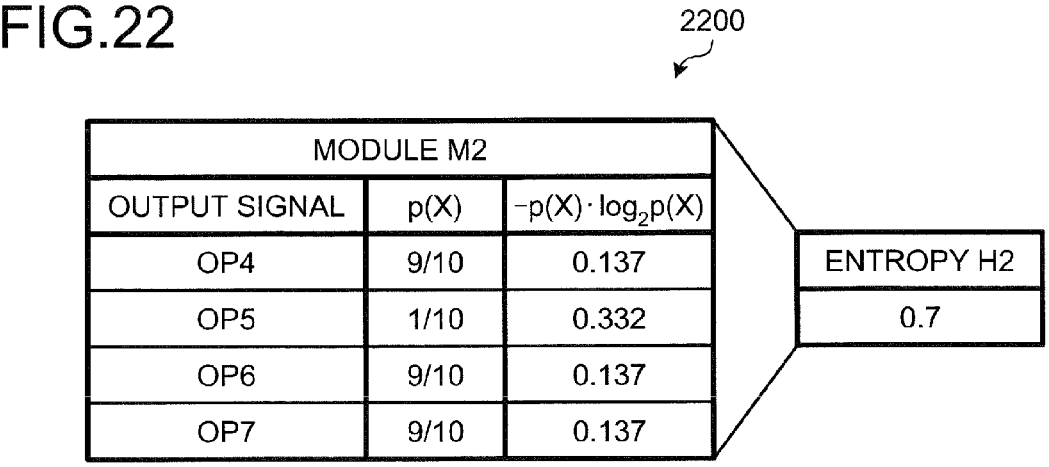
Figure 23:
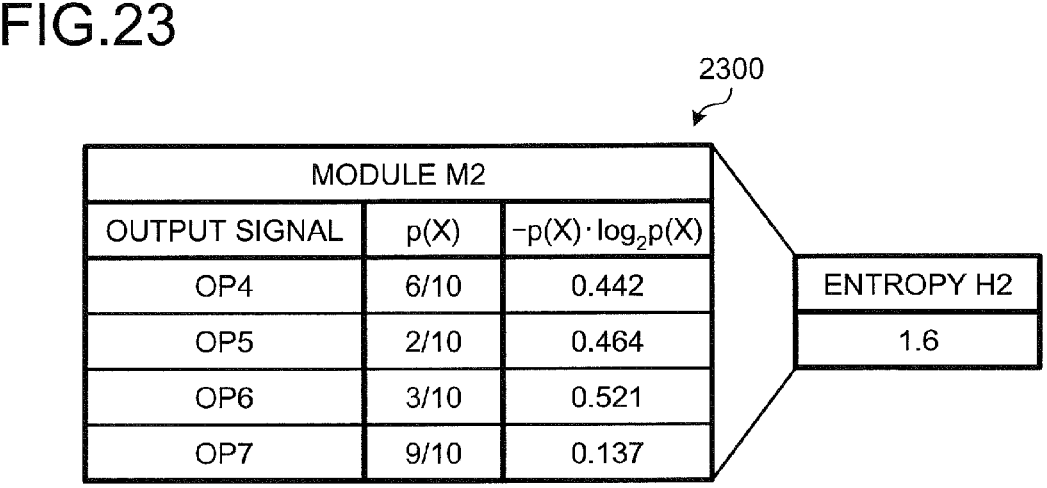
Figure 24:
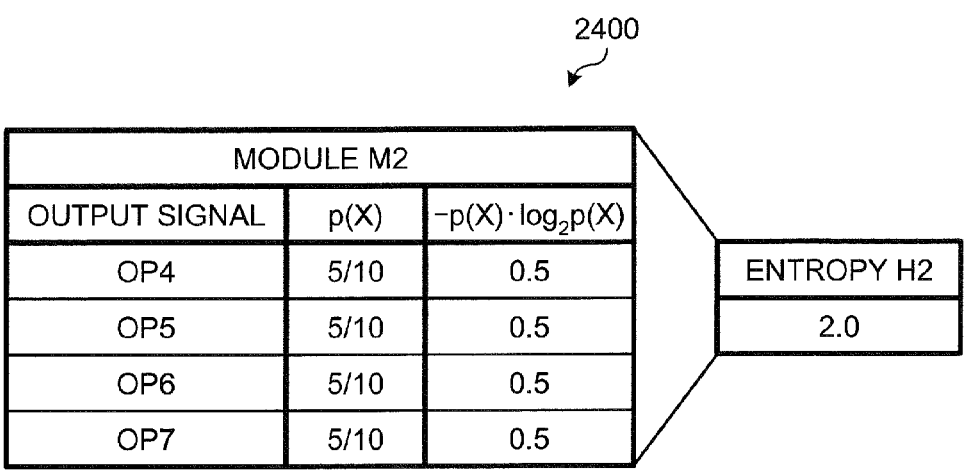

FIG. 17 is a diagram of one example of input/output signals of a module. As depicted in FIG. 17, a module M is a combinational circuit including logical gates G1 to G6. IPa to IPe are input signals to the module M, and OPa to OPd are output signals (output to a destination external to the module M) from the module M.

In the second embodiment, a power index of the module M is expressed with entropy that indicates an expected value of a data volume to be output from the module M over an arbitrary simulation period. The entropy of the module M is obtained from a transition probability that values of the output signals OPa to OPd transition from 0 to 1 or 1 to 0 during a simulation period.

Power consumption of the module M increases as the number of transitions of the values of the output signals OPa to OPd during a simulation period increase. Entropy also increases as the number of transitions of the values of the output signals OPa to OPd increases. Consequently, power consumption of the module M increases as entropy of the module M increases.

In this embodiment, a quotient of the estimated power consumption of the module M divided by entropy is computed as a power index. The larger the power index, the more power is indicated to be wasted and the smaller the power index, the less power is indicated to be wasted. Workers, who improve power consumption, relatively evaluate the power index of each module in a circuit under design and identify a candidate that is likely to have room for improvement for lower power consumption, thereby facilitating power improvement that is performed efficiently and effectively.

A detailed process of a control unit (the obtaining unit 301 to the counting unit 306) of the power index computing apparatus 200 is explained. The first computing unit 302 computes entropy that is an expected value of a data volume to be output from a module based on a transition probability of each output signal that is output from a module during an arbitrary simulation period.

The transition probability of an output signal is a probability that the value of the output signal transitions from 1 to 0 or 0 to 1 during an arbitrary simulation period. The transition probability can be expressed with an arbitrary probability density function. A detailed process of the first computing unit 302 is described hereinafter.

The simulation period can be set freely by a user operating, for example, the input device 200 such as the keyboard 221 or the mouse 222 shown in FIG. 2. More specifically, the user may designate a clock cycle during a simulation period to set an arbitrary simulation period.

The second computing unit 303 computes a power index concerning power that is consumed for output to an external destination with respect to the estimated power consumption, based on the estimated power consumption obtained at the obtaining unit 301 and the entropy computed at the first computing unit 302.

The power index is, as explained in the first embodiment, an index for determining whether the workload of a module is comparable with the estimated power consumption of the module. For example, the second computing unit 303 computes a power index for each module based on equation (6) below where Pi is the estimated power consumption of a module M1, Hi is entropy, Xi is a power index.

$$Xi = Pi/Hi \quad (6)$$

The greater the power index Xi is (the lower Hi); the more power is consumed for output with respect to the estimated power consumption Pi. In other words, the larger the power index Xi, the more power is wastefully consumed at the module M1.

The smaller the power index Xi (the higher Hi), the less power is consumed for output with respect to the estimated power consumption Pi. In other words, the smaller the power index Xi, the less power is wastefully consumed at the module Mi.

According to this scheme, a module Mi with a larger power index Xi is selected as a subject of improvement for lower power consumption, whereby a significant power reduction can be expected and effective and efficient power improvement can be facilitated.

A detailed process of the first computing unit 302 is explained. Here, entropy of a module is obtained based on a simulation result indicating output signals whose values have changed during a clock cycle and based on an interface table defining output signals from each module.

At each clock cycle within a simulation period, based on the simulation result and the interface information, the determining unit 305 determines whether an output signal whose value has transitioned during the simulation period and an output signal of a module match.

FIG. 18 is diagram of another example of a simulation result. As depicted in FIG. 18, a simulation result 1800 includes signal information items 1800-1 to 1800-n indicating output signals whose values changed while an application was running.

The signal information 1800-1 to 1800-n includes, for each clock cycle, the name of a signal whose value changed during clock cycle 1 to n. For example, for the signal information item 1800-1, the values of the output signals OP1 and OP3 changed at clock cycle 1.

FIG. 19 is diagram of another example of an interface table. As depicted in FIG. 19, an interface table 1900 includes interface information items 1900-1 to 1900-m defining names of output signals OP1 to OPx output from modules M1 to Mm. For example, for the interface information item 1900-1, output signals OP1, OP2 and OP3 output from the module M1 are defined.

In this case, the determining unit 305 extracts signal information item 1800-j for an arbitrary clock cycle j (j=1, 2, ..., n) from the simulation result 1800. The determining unit 305 refers to the signal information 1800-j using the signal name as a clue and identifies an output signal whose value has changed at clock cycle j.

Next, the determining unit 305 refers to the interface table 1900 using the signal name as a clue and determines whether output signals OP1 to OPx and the identified output signal match. In this way, it is determined to which module (Ml to Mm) and to which output signal (OP1 to OPx), the output signal whose value changed at clock cycle j corresponds.

For example, from the signal information item 1800-1 and the interface information item 1900-1, it is recognized that values of output signals OP1 and OP3 from the module M1 have changed at clock cycle 1. The determining process above is repeated until all signal information items 1800-1 to 1800-n are extracted from the simulation result 1800.

The counting unit 306 counts the number of transitions of the output signals for each module when the determining unit 305 determines the signals match. Here, a counting result table that stores a counting result of the counting unit 306 is explained. FIG. 20 is a diagram of an example of the counting result table.

As depicted in FIG. 20, a counting result table 2000 stores the number of transitions during a simulation period (clock cycle 1 to n) for each output signal OP1 to OPx output from modules M1 to Mm. For example, for an output signal OP1 of the module M1, the number of transitions during the simulation period is N1.

The first computing unit 302 computes a transition probability for each output signal based on the counting result of the counting unit 306. For example, a transition probability is obtained according to equation (7) below where $p_k(X)$ is a transition probability of OPk (X is a parameter, and k=1, 2, ..., x), Nk is the number of transitions of OPk, and T is a simulation time.

$$Pk(X)=Nk/T \quad (7)$$

The simulation period is defined from clock cycle 1 to clock cycle 10 and the simulation time is defined to be 10. For example, with reference to the counting result table 2000, when the number of transitions N1 of OP1 is substituted into equation (7) above, the transition probability of OP1 is obtained as $p_1(X)=N1/10$.

The first computing unit 302 computes entropy of a module based on the transition probability for each output signal of modules. For example, entropy Hi (i=1, 2, ..., m) of a module M1 is obtained based on equation (8) below where K is used to distinguish output signals of a module M1.

$$Hi = -\sum_K P_K(X) \cdot \log_2(P_K(X)) \quad (8)$$

As one example, entropy H1 of the module M1 is calculated according to equation (8); namely, a summation concerning OP1 to OP3 being computed as follows:

$$H1 = -p_1(X) \cdot \log_2(p_1(X)) - p_2(X) \cdot \log_2(p_2(X)) - p_3(X) \cdot \log_2(p_3(X)).$$

An entropy table storing a computing result of the first computing unit 302 is explained. Here, a simulation period is 10 cycles from clock cycle 1 to 10 (simulation time: T=10) and entropy H2 of M2 is computed.

FIGS. 21 to 25 are diagrams of contents of the entropy table. As depicted in FIGS. 21 to 25, entropy tables 2100 to 2500 store transition probabilities p(X) for each output signal OP4 to OP7 of the module M2, intermediate data $-p(X) \cdot \log_2 p(X)$, and entropy H2 of M2.

The entropy table 2100 stores entropy H2 where the number of transitions of OP7 is especially large, and the number of transitions of OP4 to OP6 is one and the number of transitions of OP7 is nine. H2 in this case is 1.10.

The entropy table 2200 stores entropy H2 where the number of transitions of OP5 is especially small, and the number of transitions of OP4, OP6, and OP7 is nine and the number of transitions of OP5 is one. H2 in this case is 0.7.

The entropy table 2300 stores entropy H2 where the numbers of transitions of OP4 to OP7 vary, and the numbers of transitions of OP4 to OP7 are six, two, three, and nine, respectively. H2 in this case is 1.6.

The entropy table 2400 stores entropy H2 where the numbers of transitions of OP4 to OP7 are equivalent, and the numbers of transitions of OP4 to OP7 are five, respectively. H2 in this case is 2.0.

The entropy table 2500 stores entropy H2 where the numbers of transitions of OP4 to OP7 are equivalent, and the numbers of transitions of OP4 to OP7 are nine, respectively. H2 in this case is 0.55.

According to these entropy tables 2100 to 2500, H2 takes a maximum value when each output signal OP4 to OP7 transitions evenly (see the entropy table 2400). On the other hand, H2 decreases when each output signal OP4 to OP7 transitions unevenly (see the entropy table 2100 to 2300).

The term "evenly" does not mean that signals transit identically but that there is not unevenness in a transition probability. For example, when of the output signals OP4 to OP7 respectively transitions five times out of ten, there is no unevenness and thus entropy H2 becomes large.

When transitions happen nine times out of ten for each of the output signals OP4 to OP7, the transition probability is biased toward transition and thus entropy H2 decreases (see the entropy table 2500). In conclusion, the term "evenly" means that the probability of transition and the probability of non-transition are even and not that the transition probabilities of all output signals OP4 to OP7 are equal.

A power index X2 of M2 is a quotient where estimated power consumption P2 is divided by entropy H2. As show in the examples above, when the numbers of transitions of OP4 to OP7 are all five (entropy H2 is maximized), the power index X2 is minimized (X2=P2/2.0) and thus wasteful power consumption is reduced. When the numbers of transitions of OP4 to OP7 are all nine (entropy H2 is minimized), the power index X2 is maximized (X2=P2/0.55) and thus wasteful power consumption increases.

Here, that clock cycle 1 to clock cycle n are set beforehand as a simulation period.

Figures 25, 26:
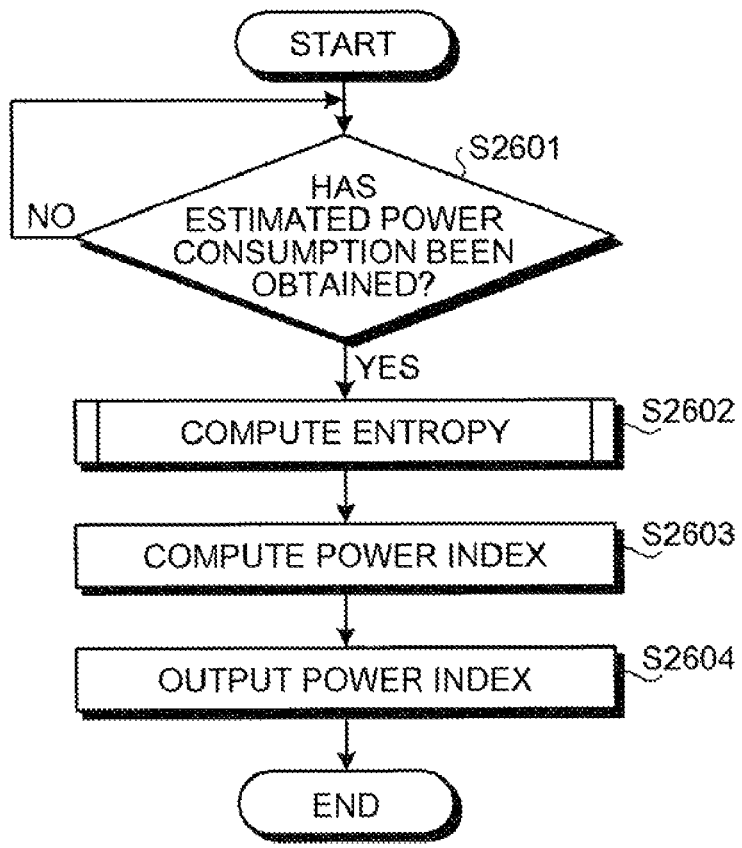

FIG. 26 is flowchart of another power index computing procedure of the power index computing apparatus. As depicted in FIG. 26, it is determined whether the obtaining unit 301 has obtains power consumption P1 to Pm for modules M1 to Mm (the power consumption list 400, for example) (step S2601).

Waiting occurs until the estimated power consumption P1 to Pm is obtained (step S2601: NO). Once the estimated power consumption is obtained (step S2601: YES), the first computing unit 302 computes entropy H1 to Hm of the modules M1 to Mm based on transition probabilities for each output signal from the modules M1 to Mm at clock cycle 1 to clock cycle n (step S2602).

Based on the estimated power consumption P1 to Pm obtained by the obtaining unit 301 and the entropy H1 to Hm computed by the first computing unit 302, the second computing unit 303 computes power indices X1 to Xm concerning power consumed for output with respect to estimated power consumption P1 to Pm of each module M1 to Mm (step S2603).

The output unit 304 outputs the power indices X1 to Xm of each module M1 to Mm computed by the second computing unit 303 (step S2604) and the flow is terminated.

Next, a detailed process of computing of entropy at step S2602 depicted in FIG. 26 is explained. Hereinafter, clock cycle is denoted as clock cycle j (j=1, 2, ..., n).

Figure 27:
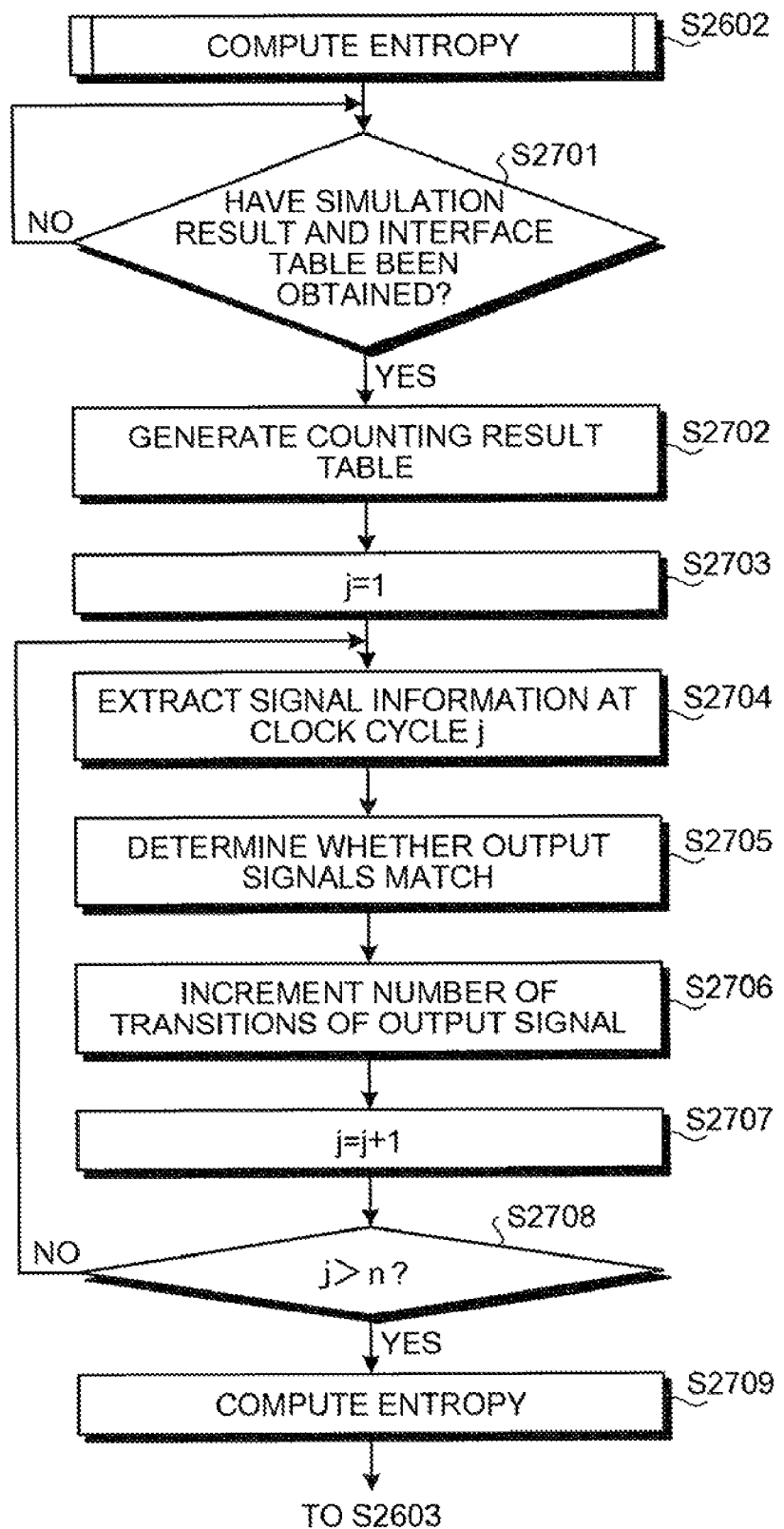
FIG. 27 is a flowchart of one example of an entropy computing process.

FIG. 27 is a flowchart of one example of an entropy computing process. It is determined whether the obtaining unit 301 has obtained the simulation result 1800 and the interface table 1900 (step S2701).

Waiting occurs until the simulation result 1800 and the interface table 1900 are obtained (step S2701: NO). Once the simulation result and the interface table are obtained (step S2701: YES), the counting result table 2000 that stores the numbers of transitions N1 to Nx of output signals OP1 to OPx of modules M1 to Mm is generated (step S2702). At this point, the numbers of transitions N1 to Nx are initialized and set to 0.

Variable j is set to 1 (j=1) (step S2703). The signal information 500-j for clock cycle j is extracted from the simulation result 1800 (step S2704). Based on the signal information 500-j and the interface table 1900, the determining unit 305 determines whether an output signal whose value has changed at clock cycle j and output signals OP1 to OPx of each module M1 to Mm match (step S2705).

The counting unit 306 increments the number of transitions of an output signal that belongs to the counting result table 2000 generated at step S2702 and that has been determined to match the signal (step S2706).

After that, j is incremented (step S2707) and it is determined whether j is more than n (step S2708).

If j is not more than n (step S2708: NO), the flow returns to step S2704. If j is more than n (step S2708: YES), the first computing unit 302 computes a transition probability for each output signal OP1 to OPx of each module M1 to Mm based on the counting result table 2000 and computes entropy H1 to Hm (step S2709). The flow proceeds to step S2603 depicted in FIG. 26.

As explained above, according to the second embodiment, a power index can be computed, the power index enabling estimation of power wastefully consumed that is exclusive of the power consumed for output with respect to the estimated power consumption of modules in a circuit under design. More specifically, a power index can be expressed with entropy that indicates an expected value of the volume of data to be output from modules during an arbitrary simulation period.

In this way, even if a user does not know the details of circuit operation, the user can objectively identify a module that is likely to be wasting significant power. As a result, a power improving operation aiming at a potential power waster can be performed effectively and efficiently, thereby reducing workload and shortening the circuit design period.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The power index computing apparatus 200 described in the embodiments can be realized by an application specific integrated circuit (ASIC) such as a standard cell or a structured ASIC or a programmable logic device (PLD) such as a field-programmable gate array (FPGA).

Specifically, for example, the functions of the units 301 to 306 of the power index computing apparatus 200 are defined in hardware description language (HDL), which is logically synthesized and applied to the ASIC, the PLD, etc., thereby enabling manufacture of the power index computing apparatus 200 can be manufactured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium storing therein a computer program that causes a computer, with respect to a circuit having one or more modules, to execute:

obtaining estimated power consumption for a module in the circuit;

computing entropy based on a transition probability of an output signal of the module during a simulation period, the entropy being indicative of an expected value of a data volume output from the module, and the output signal being output to a destination that is external to the module;

computing a first power index based on the estimated power consumption and the entropy, the first power index concerning power consumption for output of the output signal with respect to the estimated power consumption; and outputting a result of the computing of the first power index.

2. The computer-readable recording medium according to claim 1, wherein the obtaining includes obtaining a simulation result that indicates, according to clock cycle, an output signal whose value changes at a clock cycle, and an interface table that defines output signals of modules of the circuit, and the computing of the entropy includes computing the entropy based on the simulation result and the interface table.

3. The computer-readable recording medium according to claim 2, wherein the program further causes a computer to execute: determining whether a first output signal indicated in the simulation result and whose value changes and a second output signal defined in the interface table match; and counting a number of transitions of the first output signal, when the first output signal and the second output signal match, wherein the computing of the entropy, includes computing the entropy by computing the transition probability using a result obtained at the counting.

4. The computer-readable recording medium according to claim 1, the program further causing a computer to execute: computing a data volume of an effective data signal that is among the output signals transmitted from the module and is received by a recipient module; and computing, based on the estimated power consumption and the data volume, a second power index concerning power consumption for transmission of the effective data signal with respect to the estimated power consumption.

5. The computer-readable recording medium according to claim 4, the program further causing a computer to execute: obtaining a simulation result that indicates, according to clock cycle, a control signal whose value changes at a clock cycle, and an interface table that defines, according to interface, a control condition for data communication between the module and the recipient module to be established, wherein the computing of the data volume of the effective data signal is based on the simulation result and the interface table.

6. The computer-readable recording medium according to claim 5, the program further causing a computer to execute: determining whether a first control signal whose value changes at one or more clock cycles and a second control signal that is defined in the control condition match; and counting a number of times the control condition is met when the first control signal and the second control signal match, wherein the computing of the data volume of the effective data signal is based on a counting result obtained at the counting of the number of times the control condition is met and a number of bits of the effective data signal transmitted and received between the module and the recipient module when the control condition is met.

7. The computer-readable recording medium according to claim 6, wherein the computing of the data volume of the effective data signal is based on a priority level of the effective data signal.

8. The computer-readable recording medium according to claim 6, wherein the determining of whether a first control signal and a second control signal match, when a plurality of second control signals is defined in the control condition, includes determining whether the first control signal and one of the second control signals match.

9. The computer-readable recording medium according to claim 6, wherein the determining of whether a first control signal and a second control signal match, when the control condition is met at consecutive clock cycles including a first clock cycle followed by a second clock cycle, includes determining whether a first value of the effective data signal at the first clock cycle and a second value of the effective data signal at the second clock cycle match, and the counting of the number of times the control condition is met includes counting the number of times the control condition is met when the first value and the second value do not match.

10. The computer-readable recording medium according to claim 1, wherein the outputting includes outputting the first power index for each module in the circuit.

11. The computer-readable recording medium according to claim 10, the program further causing a computer to execute: arranging, in ascending order or descending order, power indices respectively calculated for the modules of the circuit, wherein the outputting includes outputting the power indices in the ascending order or the descending order arranged at the arranging.

12. The computer-readable recording medium according to claim 1, wherein the outputting includes outputting the first power index correlated together with the estimated power consumption.

13. The computer-readable recording medium according to claim 12, the program further causing a computer to execute: arranging, in ascending order or descending order, power indices respectively calculated for the modules of the circuit, wherein the outputting includes outputting the power indices in the ascending order or the descending order arranged at the arranging.

14. A power index computing apparatus that computes a power index for a circuit having one or more modules, comprising:

a computer;
an input device coupled to the computer; and
an output device coupled to the computer,
wherein the computer executes a program, the program includes:
an obtaining unit that obtains estimated power consumption for a module in the circuit;
a first computing unit that computes entropy based on a transition probability of an output signal of the module during a simulation period, the entropy being indicative of an expected value of a data volume output from the module, and the output signal being output to a destination that is external to the module;
a second computing unit that computes a power index based on the estimated power consumption and the entropy, the power index concerning power consumption for output of the output signal with respect to the estimated power consumption; and
an output unit that outputs a result of the second computing unit.

15. A power index computing method of computing a power index for a circuit having one or more modules, comprising:
executing by a computer operations of:
obtaining estimated power consumption for a module in the circuit; computing entropy based on a transition probability of an output signal of the module during a simulation period, the entropy being indicative of an expected value of a data volume output from the module, and the output signal being output to a destination that is external to the module;
computing a power index based on the estimated power consumption and the entropy, the power index concerning power consumption for output of the output signal with respect to the estimated power consumption; and
outputting a result of the computing of the power index.

16. A computer-readable recording medium storing therein a computer program that causes a computer to execute:
obtaining estimated power consumption for a module in a circuit; computing a data volume of an effective data signal that is among the output signals transmitted from the module and is received by a recipient module; and
computing, based on the estimated power consumption and the data volume, a power index concerning power consumption for transmission of the effective data signal with respect to the estimated power consumption; and
outputting a result of the computing of the power index.

* * * * *